(12) United States Patent
Song et al.

(10) Patent No.: US 11,899,267 B2
(45) Date of Patent: Feb. 13, 2024

(54) CAMERA MODULE AND ELECTRONIC DEVICE HAVING THE CAMERA MODULE

(71) Applicant: TRIPLE WIN TECHNOLOGY(SHENZHEN) CO.LTD., Shenzhen (CN)

(72) Inventors: Jian-Chao Song, Guangdong (CN); Jing-Wei Li, Guangdong (CN); Sheng-Jie Ding, Guangdong (CN); Shin-Wen Chen, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 179 days.

(21) Appl. No.: 17/538,058

(22) Filed: Nov. 30, 2021

(65) Prior Publication Data

US 2023/0050899 A1 Feb. 16, 2023

(30) Foreign Application Priority Data

Aug. 10, 2021 (CN) .......................... 202110914255.9

(51) Int. Cl.
*G02B 7/02* (2021.01)
*G02B 5/20* (2006.01)
*G02B 13/00* (2006.01)

(52) U.S. Cl.
CPC ................ *G02B 7/02* (2013.01); *G02B 5/20* (2013.01); *G02B 13/0015* (2013.01)

(58) Field of Classification Search
CPC .... G02B 13/001; G02B 13/0015; G02B 5/20; G02B 7/006; G02B 7/02
See application file for complete search history.

(56) References Cited

U.S. PATENT DOCUMENTS

| | | | |
|---|---|---|---|
| 2017/0264802 A1* | 9/2017 | Wang | H04N 23/54 |
| 2018/0217348 A1* | 8/2018 | Han | H04N 23/57 |
| 2019/0170994 A1* | 6/2019 | Li | G02B 21/361 |
| 2020/0092450 A1* | 3/2020 | Nozaki | G03B 11/00 |
| 2021/0048593 A1* | 2/2021 | Wells | H01L 33/62 |

FOREIGN PATENT DOCUMENTS

CN 112992702 A 6/2021

\* cited by examiner

*Primary Examiner* — Amy R Hsu
(74) *Attorney, Agent, or Firm* — ScienBiziP, P.C.

(57) ABSTRACT

A camera module includes a filter, a supporting base, a metal sheet, and a fixing member. The supporting base includes a first through hole, a first surface, and a second surface. A receiving groove is recessed from the second surface toward the first surface, an inner wall defining the receiving groove includes a bottom surface. The first through hole penetrates the first surface and the bottom surface. The metal sheet is received in the receiving groove and includes a second through hole. A central axis of the second through hole is collinear with a central axis of the first through hole. The metal sheet further includes a supporting platform exposed from the first through hole, the filter is mounted on the supporting platform and received in the first through hole. The fixing member is arranged on the supporting base to fix the metal sheet to the supporting base.

16 Claims, 7 Drawing Sheets

CAMERA MODULE AND ELECTRONIC DEVICE HAVING THE CAMERA MODULE

FIELD

The subject matter herein generally relates to a camera module and an electronic device having the camera module.

BACKGROUND

Electronic products (such as mobile phones or tablet computers, etc.) usually contain cameras. The camera includes a base between a lens and a circuit board. The base usually includes a protrusion to support a filter. However, in order to ensure the strength of the protrusion to support the filter, the protrusion needs to have a relatively large thickness, which is not conducive to the miniaturization of the camera.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
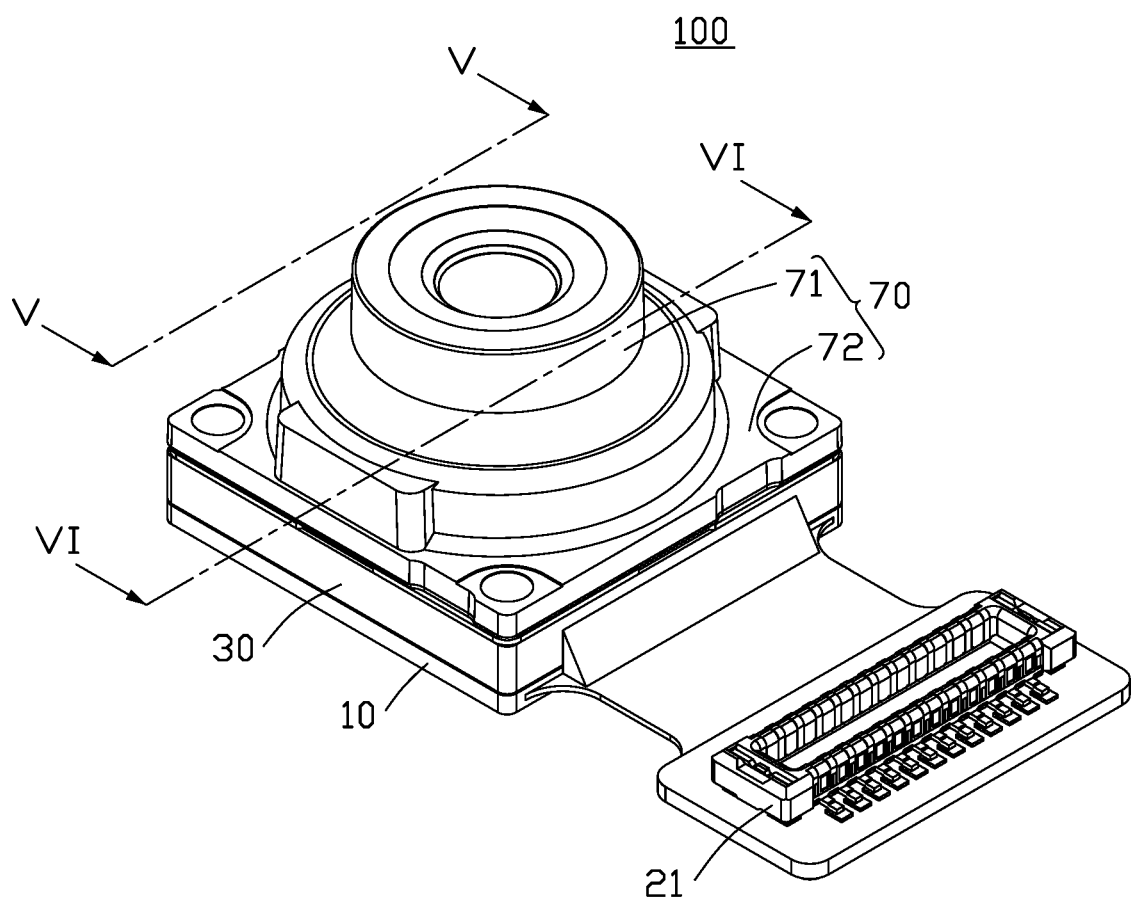
FIG. 1 is a diagram of an embodiment of a camera module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
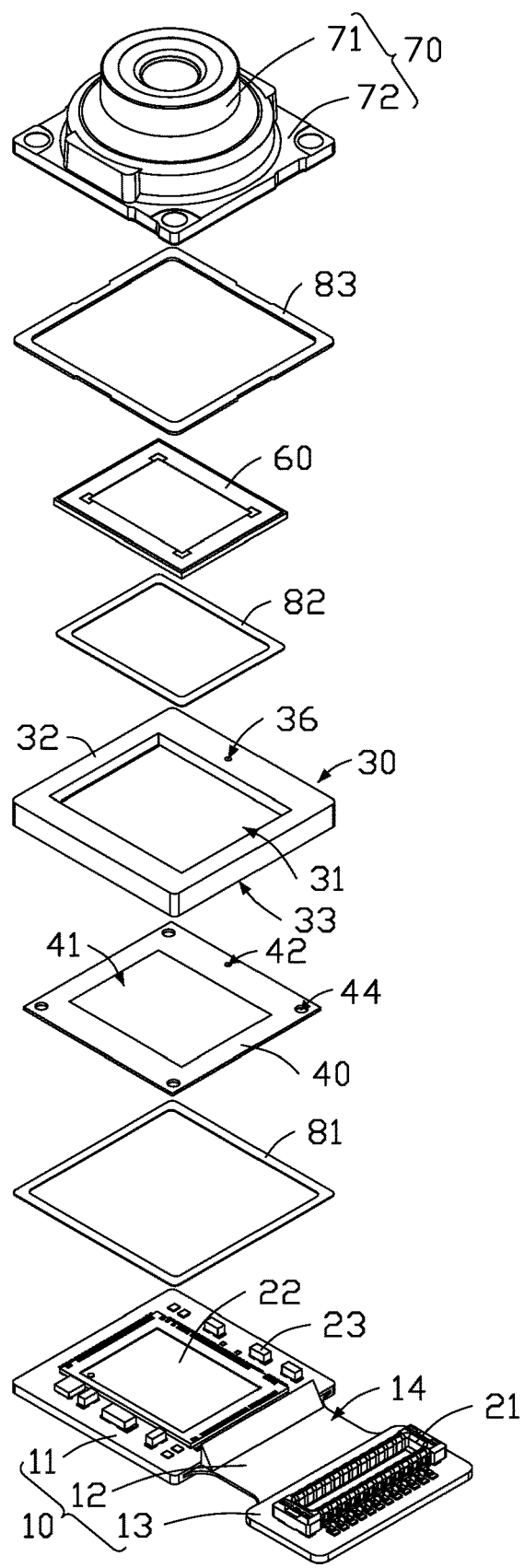
FIG. 2 is an exploded, diagrammatic view of an embodiment of a camera module according to the present disclosure.

FIG. 1 illustrates an embodiment of a camera module 100. Referring to FIGS. 1 and 2, the camera module 100 includes a supporting base 30, a metal sheet 40, and a filter 60. In at least one embodiment, the camera module 100 may further include a circuit board 10, an electrical connecting portion 21, a photosensitive chip 22, at least one electronic element 23, and a lens assembly 70. The electrical connecting portion 21 and the photosensitive chip 22 are arranged on the circuit board 10. The at least one electronic element 23 is arranged on the circuit board 10 adjacent to the photosensitive chip 22. The supporting base 30 is arranged on the circuit board 10 and covers the photosensitive chip 22. The filter 60 and the metal sheet 40 are received in the supporting base 30. The lens assembly is mounted on the supporting base 30.

Referring to FIG. 2, the circuit board 10 includes a first portion 11, a second portion 12, and a third portion 13. The lens assembly 70 is mounted on the first portion 11. The second portion 12 is connected between the first portion 11 and the third portion 13. A surface of the circuit board 10 facing the lens assembly 70 is defined as a base surface 24. The photosensitive chip 22 is arranged on an area of the base surface 24 corresponding to the first portion 11. The circuit board 10 may be a flexible circuit board, a rigid circuit board, or a flexible-rigid circuit board. In at least one embodiment, the circuit board 10 is a flexible-rigid circuit board. The first portion 11 and the third portion 13 are rigid portions of the circuit board 10, the second portion 12 is a flexible portion of the circuit board 10. The electrical connecting portion 21 is arranged on an area of the base surface 14 corresponding to the third portion 13. The electrical connecting portion 21 may be a connector or golden finger to realize signal transmission between the camera module 100 and other electronic components (not shown).

In at least one embodiment, the camera modules 100 may includes a plurality of electronic elements 23 adjacent to the photosensitive chip 22 and arranged on the first portion 11. Each electronic element 23 may be a passive component such as a resistor, a capacitor, a diode, a transistor, a relay, or an electrically erasable programmable read-only memory.

A first adhesive layer 81 may be arranged between the circuit board 10 and the supporting base 30 to fix the supporting base 30 on the circuit board 10.

Figure 3:
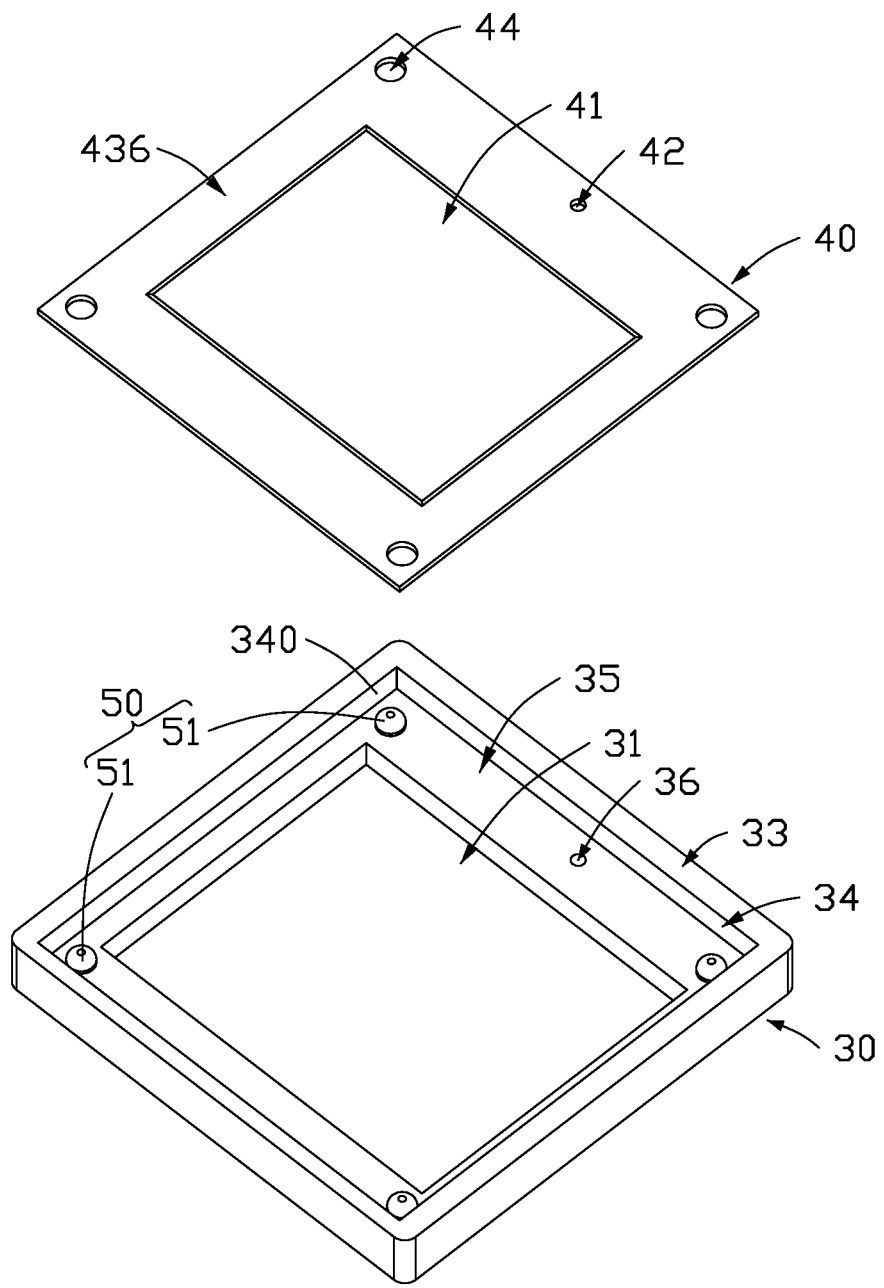
FIG. 3 is another exploded, diagrammatic view of an embodiment of a supporting base and a metal sheet according to the present disclosure.
Figure 4:
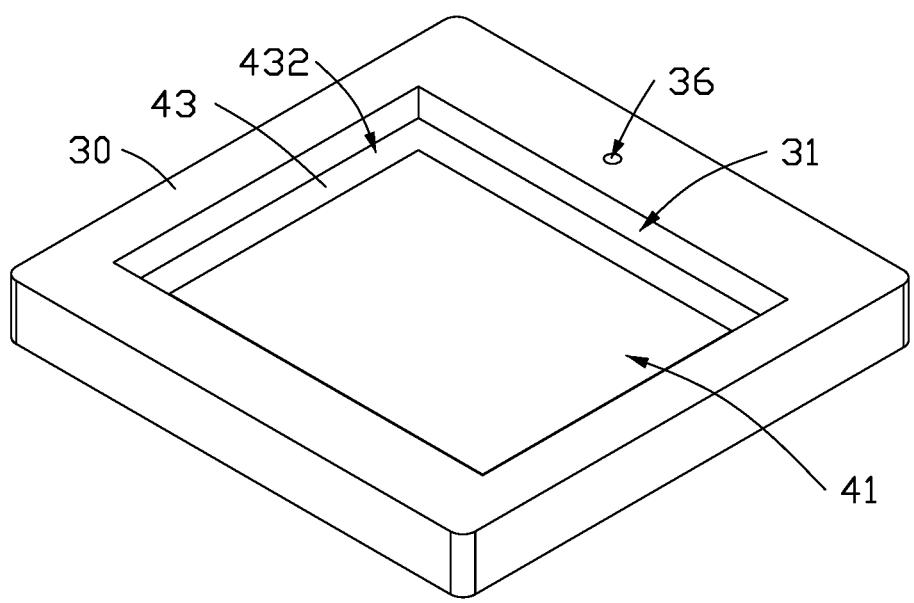
FIG. 4 is a diagram of an embodiment of a supporting base and a metal sheet

Referring to FIGS. 2, 3, and 4, the supporting base 30 may be substantially square. The supporting base 30 includes a first through hole 31, a first surface 32, and a second surface 33 facing away from the first surface 32. The second surface 33 faces and closes to the first portion 11. A receiving groove 34 is recessed from the second surface 33 toward the first surface 32. An inner wall 340 defining the receiving groove 34 includes a bottom surface 35 facing the first portion 11. The first through hole 31 penetrates the first surface 32 and the bottom surface 35, so that the first through hole 31 communicates with the receiving groove 34. The metal sheet 40 is received in the receiving groove 34 and is attached to the bottom surface 35. The metal sheet 40 includes a second through hole 41, and a central axis of the second through hole 41 is collinear with a central axis of the first through hole 31. The metal sheet 40 includes a supporting platform 43 exposed from the first through hole 31. The filter 60 is mounted on the supporting platform 43 and received in the first through hole 31.

Figure 5:
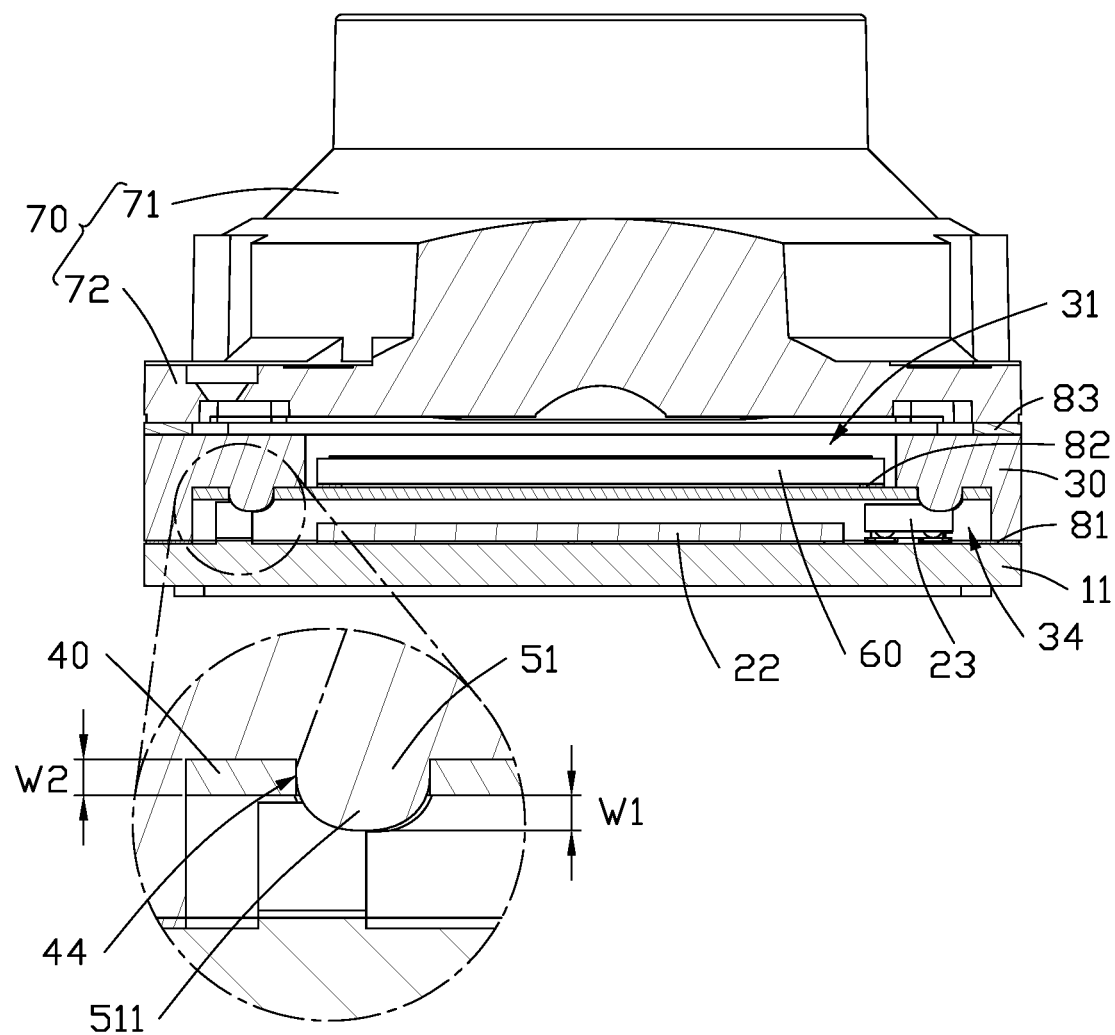
FIG. 5. is a cross-sectional view of an embodiment of the camera module taken along V-V line of FIG. 1.

Referring to FIGS. 2, 3, and 5, a fixing member 50 is arranged on the bottom surface 35 of the supporting base 30 to fix the metal sheet 40 on the supporting base 30. In at least one embodiment, the supporting base 30 and the fixing member 50 may be made of thermoplastic materials and may be integrally formed by thermoplastic. The fixing member 50 may include a plurality of rivets 51, and the plurality of rivets 51 are arranged on the bottom surface 35 at intervals. In at least one embodiment, the fixing member 50 may include four rivets 51 arranged on the bottom surface 35 at even intervals. The metal sheet 40 may be approximately square and include mounting holes 44. Each mounting hole 44 corresponds to one of the plurality of rivets 51. The metal sheet 40 is sleeved on the plurality of rivets 51 through the mounting holes 44, and the metal sheet 40 is fixed on the supporting base 30 through a hot riveting process. So that a bonding strength between the supporting base 30 and the metal sheet 40 is enhanced.

Referring to FIGS. 3 and 5, in at least one embodiment, each rivet 51 may include a protrusion 511 protruding from the metal sheet 40 and away from the bottom surface 35. The hot riveting process may include: heating an end portion of each rivet 51 away from the bottom surface 35 by ultrasonic, hot air, hot mold, or infrared, thereby melting the end portion of each rivet 51 protruding from the metal sheet 40; and then pressing the end portion of each rivet 51 protruding from the metal sheet 40 with a jig and solidifying the end portion of each rivet 51 protruding from the metal sheet 40, thereby forming the protrusion 511 with a larger cross-sectional area than the corresponding mounting hole 44 to firmly fix the metal sheet 40 to the supporting base 30.

Referring to FIGS. 3 and 5, in at least one embodiment, a longest length W1 of protrusion 511 along a direction of stacking the metal sheet 40 and the bottom surface 35 may be less than 0.05 mm. If the longest length W1 of protrusion 511 is greater than 0.05 mm, it is not conducive to a miniaturization design of the cameral module 100.

In at least one embodiment, the metal sheet 40 may be formed by stamping. A thickness W2 of the metal sheet 40 along the direction of stacking the metal sheet 40 and the bottom surface 35 may be in a range of 0.08 mm to 0.1 mm, which not only can effectively support the filter 60, but also can reduce a thickness of the cameral module 100.

Referring to FIGS. 2 and 3, in at least one embodiment, four rivets 51 may be arranged at equal intervals.

In at least one embodiment, a blocking layer 436 may cover the whole surface of the metal sheet 40. The blocking layer 436 may be formed by spraying and baking varnish to form a black layer. A thickness of the blocking layer 436 may be in a range of 0.01 mm to 0.015 mm, which can reduce a reflectivity of the metal sheet 40, improve an imaging quality of the camera module 100, and reduce a risk of exposure.

Figure 6:
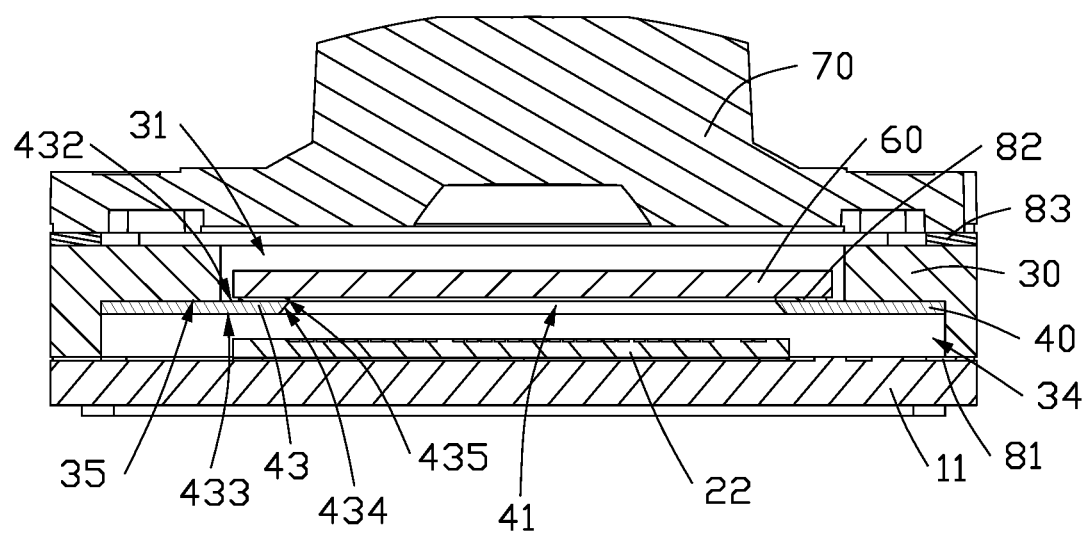
FIG. 6 is a cross-sectional view of an embodiment of the camera module taken along VI-VI line of FIG. 1.

Referring to FIGS. 4, 5, and 6, the supporting platform 43 includes a fourth surface 432 and a fifth surface 433 facing away from the fourth surface 432. The filter 60 is mounted on the fourth surface 432. An inclined surface 434 is connected between the fourth surface 432 and the fifth surface 433, and an angle between the inclined surface 434 and the fourth surface 432 is an acute angle. The inclined surface 434 defines the second through hole 41. A connection between the inclined surface 434 and the fourth surface 432 is a sharp corner 435, which can prevent an incident light from the lens assembly 70 from being reflected at the sharp corner 435, thereby preventing the camera module 100 from generating stray light and improving the imaging quality.

Referring to FIG. 2, in at least one embodiment, the filter 60 and the supporting platform 43 may be bonded by a second adhesive layer 82.

Referring to FIGS. 2, 3, and 4, in at least one embodiment, a first air escaping hole 36 penetrating the first surface 32 of the supporting base 30 and the bottom surface 35 of the supporting base 30 may be formed. A second air escaping hole 42 corresponding to the first air escaping hole 36 may be formed in the metal sheet 40. In at least one embodiment, a width of the second air escaping hole 42 may be the same with a width of the first air escaping hole 36.

Referring to FIG. 2, the lens assembly 70 is mounted on the supporting base 30. The lens assembly 70 includes a lens 71 and a lens holder 72. The lens 71 is mounted on the lens holder 72. In at least one embodiment, the lens 71 and the lens holder 72 are fixed together by a third adhesive layer 83.

Figure 7:
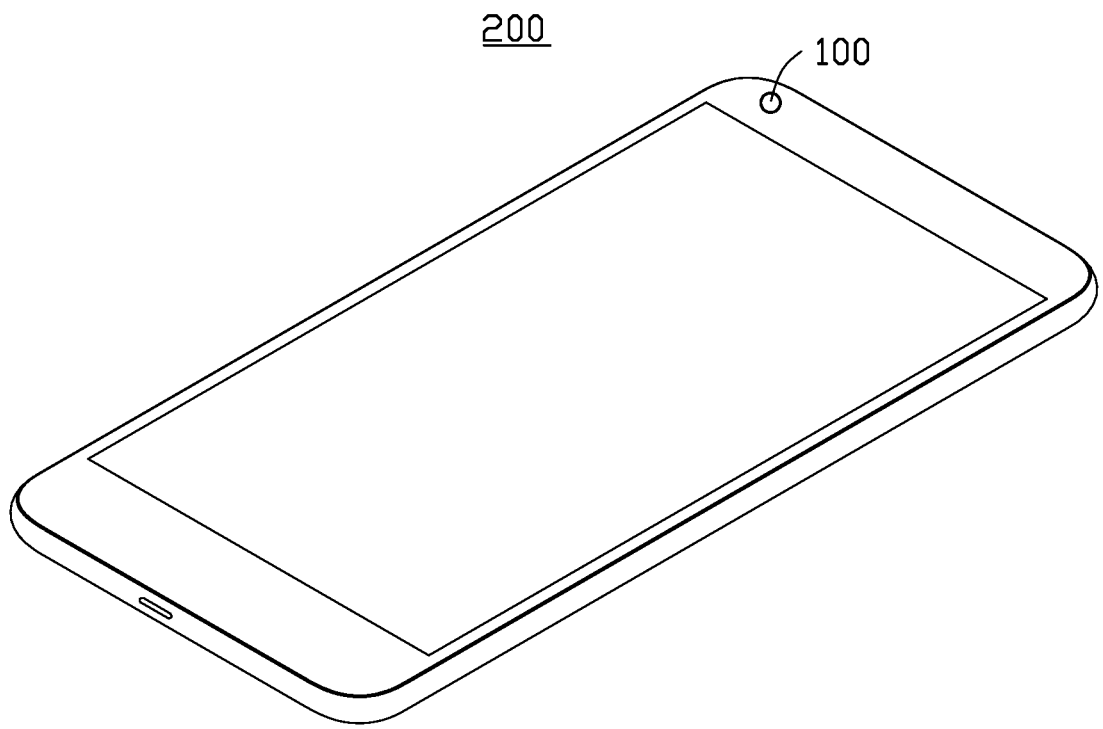
FIG. 7 is a diagram of an embodiment of an electronic device according to the present disclosure.

FIG. 7 illustrates an embodiment of an electronic device 200 including the above camera module 100. The electronic device 200 may be, but not limited to, a mobile phone, a wearable device, a vehicle, or a monitoring device.

In the camera module 100, the supporting platform 43 is exposed from the first through hole 31, and the filter 60 is mounted on the supporting platform 43. In this way, a structural strength of the metal sheet 40 is used to support the filter 60, and the fixing member 50 is used to realize the fixation between the supporting base 30 and the metal sheet 4, thereby facilitating the miniaturization design of the camera module 100.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera module comprising:
   a filter;
   a supporting base comprising a first through hole, a first surface, and a second surface facing away from the first surface, wherein a receiving groove is recessed from the second surface toward the first surface, an inner wall defining the receiving groove comprises a bottom surface facing away from the first surface, the first through hole penetrates the first surface and the bottom surface to communicates with the receiving groove;
   a metal sheet received in the receiving groove, wherein the metal sheet comprises a second through hole, a central axis of the second through hole is collinear with a central axis of the first through hole, the metal sheet further comprises a supporting platform exposed from the first through hole, the filter is mounted on the supporting platform and received in the first through hole; and
   a fixing member arranged on the supporting base to fix the metal sheet to the supporting base;
   wherein a first air escaping hole penetrates the first surface and the bottom surface of the supporting base, a second air escaping hole corresponding to the first air escaping hole is formed in the metal sheet.

2. The camera module of claim 1, wherein a thickness of the metal sheet along a stacking direction of the metal sheet and the bottom surface is in a range of 0.08 mm to 0.1 mm.

3. The camera module of claim 1, wherein the fixing member comprises a plurality of rivets arranged on the bottom surface of the supporting base at intervals, the metal sheet further comprises a plurality of mounting holes, each of the plurality of mounting holes cooperates with one of the plurality of rivets to fix the metal sheet to the supporting base.

4. The camera module of claim 3, wherein the metal sheet is sleeved on the plurality of rivets through the plurality of mounting holes, each of the plurality of rivets comprises a protrusion protruding from the metal sheet and away from the bottom surface.

5. The camera module of claim 4, wherein a longest length of the protrusion along a stacking direction of the metal sheet and the bottom surface is less than 0.05 mm; along a width direction perpendicular to the stacking direction, a largest width of the protrusion is greater than a width of one of the plurality of mounting holes corresponding to the protrusion.

6. The camera module of claim 1, wherein a blocking layer covers the whole surface of the metal sheet.

7. The camera module of claim 1, wherein the supporting platform comprises a fourth surface and a fifth surface facing away from the fourth surface, the filter is mounted on the fourth surface, an inclined surface defining the second through hole is connected between the fourth surface and the fifth surface, and an angle between the inclined surface and the fourth surface is an acute angle.

8. The camera module of claim 1, wherein the supporting base and the fixing member are integrally formed.

9. An electronic device comprising:
a camera module comprising:
  a filter;
  a supporting base comprising a first through hole, a first surface, and a second surface facing away from the first surface, wherein a receiving groove is recessed from the second surface toward the first surface, an inner wall defining the receiving groove comprises a bottom surface facing away from the first surface, the first through hole penetrates the first surface and the bottom surface to communicates with the receiving groove;
  a metal sheet received in the receiving groove, wherein the metal sheet comprises a second through hole, a central axis of the second through hole is collinear with a central axis of the first through hole, the metal sheet further comprises a supporting platform exposed from the first through hole, the filter is mounted on the supporting platform and received in the first through hole; and
  a fixing member arranged on the supporting base to fix the metal sheet to the supporting base;
  wherein a first air escaping hole penetrates the first surface and the bottom surface of the supporting base, a second air escaping hole corresponding to the first air escaping hole is formed in the metal sheet.

10. The electronic device of claim 9, wherein a thickness of the metal sheet along a stacking direction of the metal sheet and the bottom surface is in a range of 0.08 mm to 0.1 mm.

11. The electronic device of claim 9, wherein the fixing member comprises a plurality of rivets arranged on the bottom surface of the supporting base at intervals, the metal sheet further comprises a plurality of mounting holes, each of the plurality of mounting holes cooperates with one of the plurality of rivets to fix the metal sheet to the supporting base.

12. The electronic device of claim 11, wherein the metal sheet is sleeved on the plurality of rivets through the plurality of mounting holes, each of the plurality of rivets comprises a protrusion protruding from the metal sheet and away from the bottom surface.

13. The electronic device of claim 12, wherein a longest length of the protrusion along a stacking direction of the metal sheet and the bottom surface is less than 0.05 mm; along a width direction perpendicular to the stacking direction, a largest width of the protrusion is greater than a width of one of the plurality of mounting holes corresponding to the protrusion.

14. The electronic device of claim 9, wherein a blocking layer covers the whole surface of the metal sheet.

15. The electronic device of claim 9, wherein the supporting platform comprises a fourth surface and a fifth surface facing away from the fourth surface, the filter is mounted on the fourth surface, an inclined surface defining the second through hole is connected between the fourth surface and the fifth surface, and an angle between the inclined surface and the fourth surface is an acute angle.

16. The electronic device of claim 9, wherein the supporting base and the fixing member are integrally formed.

* * * * *